United States Patent [19]

Spencer et al.

[11] Patent Number: 4,627,011
[45] Date of Patent: Dec. 2, 1986

[54] VEHICLE MONITORING DEVICE

[75] Inventors: Henry B. Spencer, Peebles; Gwilym M. Owen, Penicuik, both of Scotland

[73] Assignee: National Research Development Corp., London, England

[21] Appl. No.: 500,153

[22] Filed: Jun. 1, 1983

[30] Foreign Application Priority Data

Jun. 2, 1982 [GB] United Kingdom ............... 8216057
Jul. 26, 1982 [GB] United Kingdom ............... 8221585

[51] Int. Cl.$^4$ .................... G06F 15/20; G01P 3/42
[52] U.S. Cl. .................... 364/566; 364/426; 364/463; 364/734; 73/517 B; 73/65; 73/121
[58] Field of Search ............ 364/426, 566, 463, 734; 73/517 B, 65, 121–132; 324/103 R, 103 P

[56] References Cited

U.S. PATENT DOCUMENTS

| 3,079,080 | 2/1963 | Mason | 364/463 |
| 3,638,211 | 1/1972 | Sanchez | 364/463 |
| 4,280,189 | 7/1981 | Takato et al. | 364/734 |
| 4,408,290 | 10/1983 | Kubo et al. | 364/566 |

FOREIGN PATENT DOCUMENTS

| 1094734 | 12/1967 | United Kingdom . |
| 1134650 | 11/1968 | United Kingdom . |
| 1271645 | 4/1972 | United Kingdom . |
| 1315581 | 5/1973 | United Kingdom . |
| 1363080 | 8/1974 | United Kingdom . |
| 227652 | 1/1967 | U.S.S.R. ........................ 73/65 |
| 424035 | 9/1971 | U.S.S.R. ........................ 73/65 |

OTHER PUBLICATIONS

H. B. Spencer, G. M. Owen, A Device for Assessing the Safe Descent Slope of Agricultural Vehicles, reprinted from J. Agr. Engng. Res. (1981) 26, pp. 277–286.

Primary Examiner—John W. Caldwell, Sr.
Assistant Examiner—Donna Angotti
Attorney, Agent, or Firm—Cushman, Darby & Cushman

[57] ABSTRACT

A vehicle monitoring device 10 consists of a damped-pendulum transducer 12 coupled to a potentiometer 14. The analog output of the potentiometer 14, following a braking test with the vehicle concerned, is sampled in a peak/trough detector 16. A microprocessor 18 comprising signal processing unit 20 and arithmetic unit 22 controls the sampling and sums, averages and displays the output of microprocessor 18 on a digital display 24. If desired, a suitably programmed small computer may be used in place of microprocessor 18. According to one aspect of the invention, the device 10 is adapted to serve as a brake-efficiency meter. In this case, the display 24 will be arranged to display the average, or currently-measured, deceleration, as the case may be. In an alternative application, the device 10 is adapted to serve as a safe-slope meter. In this case, the display 24 will be arranged to display the safe-slope limit in degrees and the device will preferably also be operable to give audio and/or visual warnings to the driver of the vehicle when the angle of the vehicle reaches some predetermined relationship with the critical descent angle.

10 Claims, 1 Drawing Figure

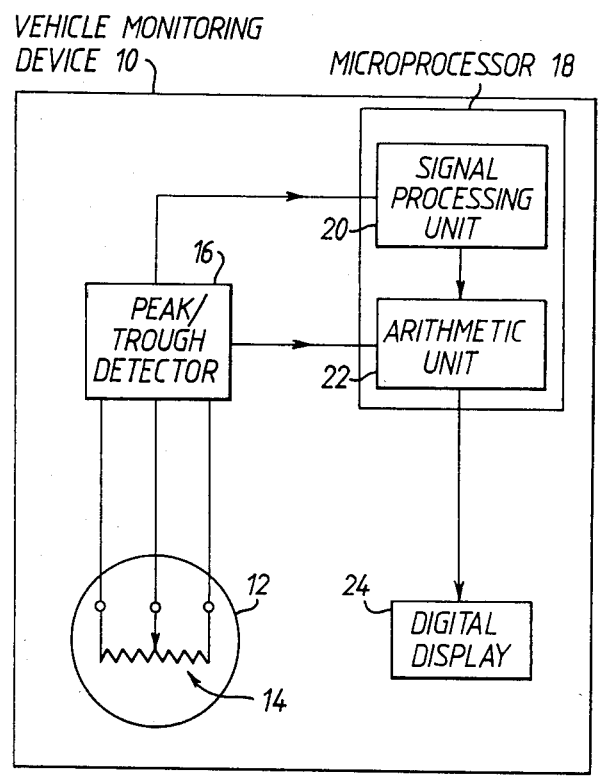

VEHICLE MONITORING DEVICE

The present invention relates to a vehicle monitoring device. The device has application both as a brake efficiency meter, i.e. as a metr that measures the braking efficiency of a vehicle, and as a safe-slope system for use, in particular, but not exclusively, with tractors and other agricultural equipment.

Turning to the first of these two aspects, it should be noted that, at present, the braking efficiency of a vehicle is usually measured with meters incorporating an accelerometer. The meters of this kind urrently in use make use of a mechanical ratchet to lock the accelerometer scale at the position reached during the braking test thereby to enable a reading of deceleration to be recorded.

Unfortunately, it will often happen that localized surface regions will be present at the test site which will provide better than average grip and this will cause the accelerometer pendulum to "peak". That is to say the above-average deceleration occurring during travel over these localized regions will swing the pendulum further than it would otherwise have gone and the ratchet mechanism will prevent it from returning to what may be considered its "correct" displacement.

In an attempt to overcome this problem, an apparatus has already been proposed for measuring the braking efficiency of a vehicle in which the slider of a pendulum type accelerometer is displaced during a braking test to tap off a voltage representing the deceleration which is integrated twice to determine the distance travelled by the vehicle from the instant of applying the brake.

This apparatus, which is described in GB No. 1094734, is subject to a number of disadvantages which seriously detract from its overall performance. For example if the brake pedal is inadvertently pressed before the braking test begins, then the distance registered by the meter will be the total distance covered from the first pressing of the brake pedal rather than the distance covered only when the brake has been fully applied to begin the brake test proper. Even if the brake pedal is pressed only once, however, the indicated braking distance will be a subjective value in so far as it will depend on the manner in which the brakes are applied. For example, the greater the initial force exerted on the brake pedal, the shorter is the overall braking distance and vice versa. Other operational deficiencies stem from particular design features of the apparatus. For example it only tests over part of the true braking distance and further errors will occur unless the vehicle can be accelerated to just the right constant velocity before the brakes are applied to begin the test. To summarize, the apparatus of GB No. 1094734 is inherently inaccurate and unable to produce accurately reproducible results.

Turning now to the second aspect of the present invention, it is an established fact that severe tractor accidents often occur when the driver unwittingly attempts to operate the tractor on slopes above the safe working limit. The tendency for tractors to "toboggan" in such circumstances has long been recognised as an important safety problem and, in a paper published in the Journal of Agricultural Engineering Research (1981), Spencer & Owen described how a pendulum accelerometer can be used in a brake test to determine the safe working limit of such slopes for a particular tractor or tractor combination and ground surface condition. This paper established that there is a relationship between brake-induced deceleration and downhill slope safety assuming the same surface conditions, tractor configuration (including ballast distribution) and the presence or not of a trailed vehicle.

For the reasons discussed above, the existing mechanical ratchet type of meter will record only the maximum deceleration value and, as explained, this will not be representative of the average deceleration value if surface conditions vary significantly at the test site. This of course can lead to over-optimistic results which means that the critical slope value at which downhill tobogganing effects will first occur is in fact less and possibly significantly less than that predicted by the deceleration tests.

Other known accelerometer-based meters use a paper chart record of the deceleration occurring during the braking test but this suffers from the disadvantage that it requires further processing to obtain the average decleration occurring over the test.

In the device of the present invention, ratchet mechanisms and chart records are omitted and the results measured by the device are independent of the manner in which the vehicle is driven. The above drawbacks are therefore avoided.

In its broadest form, the invention provides a vehicle monitoring device comprising an accelerometer linked to a microprocessor or small computer operative to average out any deceleration peaks and subsequent troughs occurring when vehicle-supporting regions at a braking test site provide the wheels of the vehicle with other than average grip.

In a preferred embodiment, the microprocessor or the like is operative to average out deceleration peaks and troughs occurring during a time interval of predetermined length, the microprocessor further operating to repeat this averaging process in a series of overlapping time intervals and to identify the maximum average achieved over any said time interval of the test and to display and/or record a derived value representing said maximum average or, if more than one test has been effected, the average of said derived values.

It is found that the deceleration value derived in this way is close to that obtained by manually fitting the best straight line to the deceleration v. time plot of the vehicle's motion occurring during the brake test.

According to the first aspect of the present invention, the device is adapted to serve as a vehicle brake efficiency meter in which case the derived value, or the average of the derived values, as the case may be, is indicative of the braking efficiency of the vehicle under test.

In this case, the microprocessor or small computer might, for example, be so programmed that up to 99 tests, say, could be performed, the results stored, and subsequently the mean value obtained and displayed by the meter.

The microprocessor or computer is preferably so programmed that the displayed deceleration can be in selectable units, e.g. "% g" (percentage of acceleration due to gravity); "m s$^{-2}$" (meters per second squared); or "ft s$^{-2}$" (ft per second squared). When other units are to be displayed, these can be easily obtained by selecting an appropriate portion of the microprocessor or computer program, e.g. from either a hard wire connection or a selectable switch.

Alternatively, the same device can be used as a so-called surface friction meter by comparing the braking efficiency value for the surface under test with the value derived on a reference surface.

According to the second aspect of the present invention, the vehicle monitoring device is adapted to serve as a safe-slope meter in which case the derived value, or the average of the derived values, as the case may be, is indicative of the safe slope for the vehicle under test.

In this latter case, the output signal from the microprocessor may be used in one of the following three ways:

(1) to calculate the critical descent slope from one or more brake tests;

(2) to display continuously the angle of ascent or descent with respect to the direction of travel of the vehicle to which the system is attached; and (3) to give audio and/or visual warnings to the driver of the vehicle when the angle of the vehicle reaches some predetermined relationship with the critical descent angle, e.g. when it is equal or greater to the critical descent angle.

Embodiments of the invention will now be described, by way of example only, with reference to the accompanying drawing which illustrates, in block-diagram form, the essential integers of a particular vehicle monitoring device in accordance with the present invention.

Thus, referring to the drawing, a vehicle monitoring device 10 consists of a pendulum transducer 12 coupled to a potentiometer 14. Conveniently the transducer 12, which might be an inertial accelerometer, comprises a damped pendulum, e.g. one limited to a ±45° displacement or to any other displacement up to ±90°.

The analog or digital output of the potentiometer 14, following a braking test with the vehicle (not shown), is sampled in a peak/trough detector 16. A microprocessor 18 comprising signal-processing unit 20 and arithmetic unit 22 controls the sampling, and sums, averages and displays the output of the microprocessor 18 on a digital display 24. If desired, a suitably programmed small computer may be used in place of microprocessor 18. The meter is carried in the vehicle within sight and reach of the driver.

When the device 10 is to be used as a brake efficiency meter or for monitoring surface friction, then microprocessor 18 will be adapted to show deceleration values on the digital display 24. In this case, the driver can measure the deceleration of the vehicle during a locked wheel brake test as follows. First, the meter is switched to 'test'. The driver then makes one to six locked-wheel brake tests, preferably on the level although slight slopes can be tolerated. After six tests, or more if necessary, the meter will average the individual readings and output the vehicle brake efficiency in the chosen units.

In more detail, the power supply to the meter 10 is switched on and the initial deceleration is set to 100% g (or equivalent) until the first brake test is performed. Switching the power on in this way causes the controlling microprocessor, (or computer) to perform a self-test function. This begins with all the indicators on the front panel of the meter being illuminated for approximately four seconds. During this initial four second period, any lamp failures may be detected. If the microprocessor finds an internal error, then all the indicators will extinguish and the display 24 will show "99". If this occurs, the meter must be returned for service. In the absence of any internal errors, however, the display 24 will show "00" and the TEST indicator will illuminate. This indicates that no brake tests have been completed.

Next the braking test is performed. Whenever the brake is actuated during the test to produce a deliberate skid, the display 24 will go blank for three seconds and will then start to flash rapidly showing the deceleration calculated. If the result seems plausible to the driver of the vehicle, then he will press the ENTER button on the meter to cause the result to be added to a running average. The display 24 will revert to "01" to indicate that one brake test has been successfully completed. If, however, the brake was pressed inadvertently or the test was unsuccessful for some other reason, then the vehicle driver will press the START button to cause the result to be ignored and the display will revert to showing the number of successful tests so far completed.

The above procedure is repeated until the required number of tests has been completed.

Whenever the display 24 is showing the number of successful tests, the CALCULATE button may be pressed. This will cause the average result from all the completed tests to be calculated and stored as the average deceleration.

If desired, up to ninety-nine tests may be performed with the meter illustrated in the drawing but, as indicated earlier, a much lesser number, e.g. six, will usually suffice.

To facilitate the correct mounting of the meter on the vehicle, a small red dot will illuminate in the bottom left hand corner of the display whenever the decelerometer pendulum is at exactly nought degrees. This is accurate to one-sixth of a degree whereas the main display is filtered and rounds to the nearest degree. The angle of the pendulum transducer 12 in relation to the meter box can readily be adjusted using a screwdriver.

When the device 10 is to be used as a safe slope system, then the microprocessor 18 will be adapted to show the safe-slope limit in degrees on the digital display 24. In this case, the driver can predict the safe working limit of slope for any tractor/implement combination by doing a simple locked wheel brake test. First the meter is switched to 'test'. The driver then makes one to six locked-wheel brake tests on a level or a lightly sloping section of ground and preferably in the same field as he intends to work in. The meter works on the principle that the braking efficiency can be converted direct into the safe-slope limit. After six tests, or more if necessary, the instrument will average the readings and output the safe-slope limit in degrees. The slope limit can be outputted for any number of tests between one and ninety-nine by an over-ride switch. The instrument can also be switched to 'continuous mode' when the slope on which the tractor stands will be continuously monitored and displayed. An alarm will sound if required, should this exceed the predicted level of a specific test. The test must be repeated if machine, field or ground conditions are changed.

In more detail, whenever the power supply to the meter 10 is switched on, the controlling microprocessor, (or computer) performs a self-test function. This begins with all the indicators on the front panel being illuminated for approximately four seconds. After this period only the 'present angle' indicator will stay illuminated and the display will show the present angle. During this initial four second period any lamp failures may be detected. If the microprocessor finds an internal error then all the indicators will extinguish and the display 24 will show "99". If this occurs, the meter must be returned for service. To preset the meter so that the alarm will only be activated if the slope exceeds some predetermined 'critical angle', the vehicle is positioned as for a brake test and the START button is pressed. The display will show "00" and the TEST indicator will illuminate. This indicates that no brake tests have been completed.

Next the brake test is performed. Whenever the brake is actuated in this way to produce a deliberate skid, the display 24 will go blank for three seconds and will then start to flash rapidly showing the critical angle calculated. If the result is plausible, then pressing the ENTER button on the meter will cause the result to be added to a running average. The display 24 will revert to "01" to indicate that one brake test has been successfully completed. If, however, the brake was pressed inadvertently or the test was unsuccessful for some other reason, then pressing the START button will cause the result to be ignored and the display will revert to showing the number of successful tests so far completed.

The above procedure is repeated until the required number of tests have been completed.

Whenever the display 24 is showing the number of successful tests, the CALCULATE button may be pressed. This will cause the average result from all the completed tests to be calculated and stored as the critical angle. The display will revert to showing the present angle. Pressing the CALCULATE button when no tests have been successfully completed will cause the critical angle value stored in the microprocessor to remain unchanged.

If desired, up to ninety-nine tests may be performed but as indicated earlier a much lesser number will usually suffice.

Pressing the CRITICAL ANGLE button at any time will cause the dispay 24 to show the critical angle for as long as the button is kept pressed.

Whenever the present angle is equal to or greater than the stored critical angle, then the display will flash at a slow rate and the audible alarm will sound. Pressing the ALARM PAUSE button will silence the alarm for approximately two minutes but the display will continue to flash.

Should the present angle exceed four degrees greater than the critical angle then the alarm will sound irrespective of the state of the ALARM PAUSE button. The only way to silence the alarm in this situation is to reduce the slope angle of the vehicle.

After switching on the power the initial angle is set to forty-five degrees until the first brake test is performed.

To facilitate the correct mounting of the meter, a small red dot will illuninate in the bottom left hand corner of the display whenever the decelerometer pendulum is at exactly nought degrees. This is accurate to one-sixth of a degree whereas the main display is filtered and round to the nearest degree. The angle of the pendulum transducer 12 in relation to the meter box can readily be adjusted using a screwdriver.

In a modification (not shown) of this embodiment, two accelerometers are mounted at right angles to one another in the vehicle under test to measure the absolute slope of the land irrespective of the vehicle's heading on the slope.

This is done by converting the signal outputs of the two accelerometers to represent equivalent inclinometer angles A and B. The microprocessor 18 then calculates the value C of the absolute slope value from the formula $C = \arctan[(\tan^2 A + \tan^2 B)^{\frac{1}{2}}]$.

The value of C obtained can then be used to warn the driver he is on a slope on which a control loss can occur.

As already explained, it is an advantage of the meters of the present invention that they average the deceleration peaks and troughs occurring during a time interval of predetermined length and then repeat this process in a series of overlapping time intervals to identify the maximum average achieved over any said time intervals of the test and to display and/or record a value derived from said maximum average or, if more than one test has been effected, the average of said derived values.

Accordingly, in operation of both the brakemeter and the slope meter described above, the signal-processing unit 20 will select the first 480 milliseconds of the signal it receives from the peak/trough detector 16 during the brake test and this will be passed to the arithmetic unit 22 for averaging of the deceleration peaks and subsequent troughs occurring during this period. The so-called "window" time of 480 milliseconds referred to above is typically 32 times the digitation or "pulse" rate of the microprocessor which in this case, therefore, is taken to be 15 milliseconds.

When the derived value has been calculated in this way it is passed to the store of the microprocessor and the unit 20 selects another 480 millisecond period of the signal, this second period starting and finishing 15 milliseconds, i.e. one "pulse", later than the first. This second section of the signal is passed to unit 22 for averaging of the decleration peaks and troughs but only if the deceleration value derived from this second 480 milliseond period exceeds that derived from the first 480 millisecond period, will it replace this first value in the store of the microprocessor.

The 480 millisecond window period of unit 20 is now moved forward by successive 15 milliseconds until the entire signal has been processed, the value in the store at the end of this processing representing the highest average deceleration value derived from any of the overlapping 480 millisecond periods investigated by the microprocessor. This value is displayed by display unit 24 and is recorded in the memory of the microprocessor for further reference.

The above procedure is then repeated in subsequent brake tests, the only difference being that in the latter case the arithmetic unit 22 will also calculate the average of the deceleration values derived from all the brake tests carried out so far in that particular session and will display this average deceleration value as well as that associated with the last brake test to be carried out.

As already discussed above, the form of display in unit 24 will depend both on the application of the device 10 and on the particular units chosen by the operator.

Throughout this application, the term "braking efficiency" is to be interpreted as meaning the deceleration value of the vehicle concerned when the brakes are fully applied e.g. expressed as a percentage of the gravitational constant "g". The term "accelerometer" is to be interpreted as also including an inclinometer or any other acceleration-responsive or deceleration-responsive transducer.

We claim:

1. A vehicle monitoring device comprising:
an accelerometer; and
processing means, responsive to said accelerometer, for: (1) averaging out decelerating peaks and troughs occurring during a time interval of predetermined length, (2) repeating said averaging function (1) in a series of overlapping time intervals a predetermined number of times, (3) identifying the maximum average achieved over any of said time intervals and (4) outputting a derived value representing said maximum average.

2. A device as claimed in claim 1 wherein said processing means is also for repeating said functions (1) through (3) and also for outputting a derived value representing the average of said maximum averages.

3. A device as in claim 1 wherein said outputting function of said processing means outputs sad derived value indicative of baking efficiency of the vehicle under test.

4. A device as in claim 1 wherein said outputting function of said processing means outputs said derived value indicative of the safe slope for the vehicle under test.

5. A device as claimed in claim 4 further compromising means for providing at least one of audio and visual warnings to the driver of the vehicle when the angle of the vehicle reaches some predetermined relationship to said safe slope.

6. A device as claimed in claim 1 further comprising means for displaying said derived value in units of the operator's choice.

7. A device as claimed in claim 2 further comprising means for displaying said derived value in units of the operator's choice.

8. A device as claimed in claim 3 further comprising means for displaying said braking efficiency in units of the operator's choice.

9. A device as claimed in claim 4 further comprising means for displaying said safe slope in units of the operator's choice.

10. A device as claimed in claim 5 further comprising means for displaying said angle in uits of the operator's choice.

* * * * *